US012553710B2

(12) United States Patent
Takeda (10) Patent No.: US 12,553,710 B2
(45) Date of Patent: Feb. 17, 2026

(54) THREE-DIMENSIONAL MEASUREMENT DEVICE

(71) Applicant: Kowa Company, Ltd., Nagoya (JP)

(72) Inventor: Jun Takeda, Soka (JP)

(73) Assignee: Kowa Company, Ltd., Nagoya (JP)

( * ) Notice: Subject to any disclaimer, the term of this patent is extended or adjusted under 35 U.S.C. 154(b) by 322 days.

(21) Appl. No.: 18/564,801

(22) PCT Filed: Mar. 8, 2022

(86) PCT No.: PCT/JP2022/009884
§ 371 (c)(1),
(2) Date: Jun. 17, 2024

(87) PCT Pub. No.: WO2022/254854
PCT Pub. Date: Dec. 8, 2022

(65) Prior Publication Data
US 2024/0384984 A1 Nov. 21, 2024

(30) Foreign Application Priority Data

May 31, 2021 (JP) ................................ 2021-091601

(51) Int. Cl.
*G01B 11/25* (2006.01)
(52) U.S. Cl.
CPC ................... *G01B 11/25* (2013.01)
(58) Field of Classification Search
CPC ..... G01B 11/24; G01B 11/00; G01B 11/2545; G01B 11/02; G01B 11/22; G01B 11/2513;
(Continued)

(56) References Cited

U.S. PATENT DOCUMENTS 9,689,668 B2 * 6/2017 Sonoda .................... G06T 7/521
11,064,116 B2 * 7/2021 Adsumilli ............ H04N 23/698
(Continued)

FOREIGN PATENT DOCUMENTS

CN 111047678 A * 4/2020 ........... G06T 15/005
CN 112418188 A * 2/2021 ............. G06F 18/24
(Continued)

OTHER PUBLICATIONS

International Search Report and Written Opinion (English Translation for ISR only) for International Patent Application No. PCT/JP2022/009884 dated May 17, 2022, pp. all.
(Continued)

*Primary Examiner* — Michael P Stafira
(74) *Attorney, Agent, or Firm* — Dorsey & Whitney LLP (57) ABSTRACT

To perform three-dimensional measurement of an object with high accuracy, a dot pattern is generated by a determination process of determining a reference position according to a rule defined by a Poisson disk sampling algorithm, a selection process of selecting one of a plurality of arrangement patterns indicating at least one or more dot arrangements, an arrangement process of arranging dots based on the arrangement pattern selected for the reference position, and an iterative process of performing the above processes a plurality of times, a projection device is controlled to project projection light including the dot pattern onto the object, an image capturing device is controlled to image-capture the object onto which the projection light is projected from two directions to acquire two captured images, parallax information is calculated about the acquire two captured images, and a three-dimensional shape of the object is specified based on the calculated parallax information.

8 Claims, 8 Drawing Sheets

(58) Field of Classification Search
CPC ..... G01B 11/0608; G01B 11/14; G01B 11/25; G01B 11/2509; G01B 11/254; G01B 11/002; G01B 11/2518; G01B 5/008; G06T 7/593; G06T 2207/10012; G06T 2207/10028; G06T 7/70; G06T 17/00; G06T 7/11; G06T 7/521; G06T 2207/30252; G06T 7/73; G06T 2207/30261; G06T 2207/10021; G06T 7/85; G06T 7/0002; G06T 7/60; G06T 19/20; G06T 2207/10032; G06T 2207/20081; G06T 5/50; G06T 7/12; G06T 7/97; G06T 19/00; G06T 2207/10024; G06T 2210/56; G06T 7/50; G06T 7/55; G06T 1/60; G06T 19/006; G06T 2207/10016; G06T 2207/20221; G06T 2207/30244; G06T 7/62; G06T 17/20; G06T 7/80; G06T 15/00; G06T 17/05; G06T 2200/04; G06T 2207/20228; G06T 2207/30184; G06T 2200/08; G06T 2207/10152; G06T 2207/20021; G06T 2207/20084; G06T 2207/30236; G06T 2207/30256; G06T 7/194; G06T 7/543; G06T 7/74; G06T 17/10; G06T 2207/10144; G06T 2207/20076; G06T 5/70; G06T 1/20; G06T 2207/20016; G06T 2207/30181; G06T 7/00; G06T 7/10; G06T 7/136; G06T 15/005; G06T 15/04; G06T 15/10; G06T 15/20; G06T 15/50; G06T 19/003; G06T 2200/16; G06T 2200/24; G06T 2207/20061; G06T 2207/20092; G06T 2207/20132; G06T 2207/30164; G06T 2207/30196; G06T 2210/12; G06T 2219/004; G06T 2219/2004; G06T 3/08; G06T 3/18; G06T 3/4038; G06T 5/77; G06T 7/168; G06T 7/246; G06T 7/44; G06T 7/536; G06T 7/579; G06T 1/00; G06T 11/60; G06T 13/80; G06T 2207/10044; G06T 2207/10068; G06T 2207/20024; G06T 2207/20224; G06T 2207/30204; G06T 2207/30232; G06T 2207/30242; G06T 2210/22; G06T 3/20; G06T 3/60; G06T 7/0012; G06T 7/20; G06T 7/269; G06T 7/33; G06T 7/66; G06T 7/90

See application file for complete search history.

(56) References Cited

U.S. PATENT DOCUMENTS

| | | | |
|---|---|---|---|
| 2016/0004920 A1 | 1/2016 | Armstrong-Crews et al. | |
| 2019/0012785 A1 | 1/2019 | Lohel et al. | |
| 2021/0156677 A1* | 5/2021 | Fu | G06T 7/521 |

FOREIGN PATENT DOCUMENTS

| CN | 112750195 A | * | 5/2021 | ......... G06T 17/00 |
|---|---|---|---|---|
| CN | 112802171 A | * | 5/2021 | ......... G06F 18/22 |
| CN | 113137916 A | * | 7/2021 | ......... G06F 18/241 |
| CN | 113295110 A | * | 8/2021 | ......... G06V 10/145 |
| JP | H0425758 A | | 1/1992 | |
| JP | 2001147110 A | | 5/2001 | |
| JP | 2014052307 A | * | 3/2014 | |
| JP | 2014106000 A | * | 6/2014 | |
| JP | 2015105899 A | | 6/2015 | |
| JP | 2019505884 A | | 2/2019 | |
| WO | WO-2015148604 A1 | * | 10/2015 | ......... G01B 11/2513 |
| WO | WO-2020235067 A1 | * | 11/2020 | ......... G01B 11/2545 |
| WO | 2022254854 | | 12/2022 | |

OTHER PUBLICATIONS

Extended European Search Report for EP Application No. 22815611.3, dated May 15, 2025, pp. all.

Ando, et al., "Three-dimensional imaging through scattering media using three-dimensionally coded pattern projection", Applied Optics, vol. 54, No. 24, Aug. 13, 2025, p. 7316, pp. all.

* cited by examiner

PRESENT EXAMPLE DOT PATTERN

Fig. 5B

CONVENTIONAL DOT PATTERN (RANDOM DOT PATTERN)

Fig. 6A

LEFT SIDE CAPTURED IMAGE
(PRESENT EXAMPLE DOT PATTERN)

Fig. 6B

RIGHT SIDE CAPTURED IMAGE
(PRESENT EXAMPLE DOT PATTERN)

Fig. 7A

CAPTURED ENLARGED IMAGE
(PRESENT EXAMPLE DOT PATTERN)

Fig. 7B

CAPTURED ENLARGED IMAGE
(CONVENTIONAL DOT PATTERN)

Fig. 8A

PARALLAX IMAGE
(PRESENT EXAMPLE DOT PATTERN)

Fig. 8B

PARALLAX IMAGE
(CONVENTIONAL DOT PATTERN)

THREE-DIMENSIONAL MEASUREMENT DEVICE

CROSS-REFERENCE TO RELATED APPLICATION(S)

This application is a continuation of PCT Application No. PCT/JP2022/009884 filed Mar. 8, 2022, which claims priority to Japanese Application No. 2021-091601 filed May 31, 2021, which are incorporated herein by reference, in their entirety, for any purpose.

TECHNICAL FIELD

The present invention relates to a three-dimensional measurement device for performing three-dimensional measurement of an object with high accuracy.

BACKGROUND ART

Conventionally, a device that measures a three-dimensional shape of an object by the principle of triangulation based on two captured images obtained by image-capturing the object from two directions has been used. Here, in a case where the principle of triangulation is used, it is necessary to specify a corresponding part between the two captured images. As a method of specifying the corresponding part, there is a method of comparing luminance information of small regions in the two captured images. However, in a case where there is a flat portion, a portion with little color change, or the like in the object, a situation in which it is difficult to specify the corresponding part with high accuracy may occur.

As a countermeasure against the situation, there is a method of projecting projection light having a predetermined pattern on an object and using the projection light for specifying a corresponding part. For example, Patent Literature 1 discloses a technique in which, in a case where it is determined that a corresponding part between two captured images cannot be accurately specified, light of a specific pattern shape is projected by a pattern projector, the corresponding part is specified using light and darkness of the specific pattern shape, and parallax information is calculated.

CITATION LIST

Patent Literature

Patent Literature 1: JP 4-25758 A

SUMMARY OF INVENTION

Technical Problem

Meanwhile, a random dot pattern is generally used as a light and dark pattern of projection light projected onto an object for the purpose of specifying a corresponding part. However, in the random dot pattern, there is a possibility that a portion of a similar dot pattern locally appears. Therefore, there is a problem that the corresponding part between the two captured images cannot be accurately specified, and as a result, a calculation result of the parallax information may not be sufficiently accurate.

The present invention has been made in view of the above problems, and an object thereof is to provide a three-dimensional measurement device capable of performing three-dimensional measurement of an object with high accuracy.

Solution to Problem

A three-dimensional measurement device according to the present invention is a three-dimensional measurement device that performs three-dimensional measurement on an object, the three-dimensional measurement device including: a dot pattern generation unit that generates a dot pattern by a determination process of determining a reference position according to a rule defined by a Poisson disk sampling algorithm, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times; a dot pattern projection control unit that controls a projection device to project projection light including the dot pattern onto the object; a captured image acquisition unit that controls an image capturing device to image-capture the object onto which the projection light is projected from two directions to acquire two captured images; a parallax information calculation unit that calculates parallax information about the acquired two captured images; and a three-dimensional shape specification unit that specifies a three-dimensional shape of the object based on the calculated parallax information.

A three-dimensional measurement device according to the present invention is a three-dimensional measurement device that performs three-dimensional measurement on an object, the three-dimensional measurement device including: a dot pattern generation processing unit that generates a dot pattern in advance and stores the dot pattern in a predetermined storage unit by a determination process of determining a reference position according to a rule defined by a Poisson disk sampling algorithm, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times; a dot pattern projection control unit that reads the dot pattern from the storage unit and controls a projection device to project projection light including the dot pattern onto the object; a captured image acquisition unit that controls an image capturing device to image-capture the object onto which the projection light is projected from two directions to acquire two captured images; a parallax information calculation unit that calculates parallax information about the acquired two captured images; and a three-dimensional shape specification unit that specifies a three-dimensional shape of the object based on the calculated parallax information.

Furthermore, in the three-dimensional measurement device according to the present invention, the plurality of arrangement patterns may be, as to where dots are arranged in a preset dot arrangement region, a combination of patterns that do not overlap each other when the dots are moved in parallel in the dot arrangement region.

A three-dimensional measurement device according to the present invention is a three-dimensional measurement device that performs three-dimensional measurement on an object, the three-dimensional measurement device including: a dot pattern generation unit that generates a dot pattern by a determination process of determining a reference dot according to a rule defined by a Poisson disk sampling algorithm, an arrangement process of arranging additional dots according to a predetermined addition rule in a predetermined range with respect to the reference dot, and an iterative process of performing the determination process and the arrangement process a plurality of times; a dot pattern projection control unit that controls a projection device to project projection light including the dot pattern onto the object; a captured image acquisition unit that controls an image capturing device to image-capture the object onto which the projection light is projected from two directions to acquire two captured images; a parallax information calculation unit that calculates parallax information about the acquired two captured images; and a three-dimensional shape specification unit that specifies a three-dimensional shape of the object based on the calculated parallax information.

A three-dimensional measurement device according to the present invention is a three-dimensional measurement device that performs three-dimensional measurement on an object, the three-dimensional measurement device including: a dot pattern generation processing unit that generates a dot pattern in advance and stores the dot pattern in a predetermined storage unit by a determination process of determining a reference dot according to a rule defined by a Poisson disk sampling algorithm, an arrangement process of arranging additional dots according to a predetermined addition rule in a predetermined range with respect to the reference dot, and an iterative process of performing the determination process and the arrangement process a plurality of times; a dot pattern projection control unit that reads the dot pattern from the storage unit and controls a projection device to project projection light including the dot pattern onto the object; a captured image acquisition unit that controls an image capturing device to image-capture the object onto which the projection light is projected from two directions to acquire two captured images; a parallax information calculation unit that calculates parallax information about the acquired two captured images; and a three-dimensional shape specification unit that specifies a three-dimensional shape of the object based on the calculated parallax information.

Furthermore, in the three-dimensional measurement device according to the present invention, the addition rule is, as to where the additional dots are arranged with respect to the reference dot, a rule for determining positions where, when the reference dot and the additional dots are moved in parallel within a predetermined range, patterns do not overlap each other with respect to a case where the additional dots are arranged at other positions.

Advantageous Effects of Invention

According to the present invention, it is possible to provide a three-dimensional measurement device capable of performing three-dimensional measurement of an object with high accuracy.

DESCRIPTION OF EMBODIMENTS

First Embodiment

Hereinafter, an example of a three-dimensional measurement device according to a first embodiment of the present invention will be described with reference to the drawings.

Figure 1:
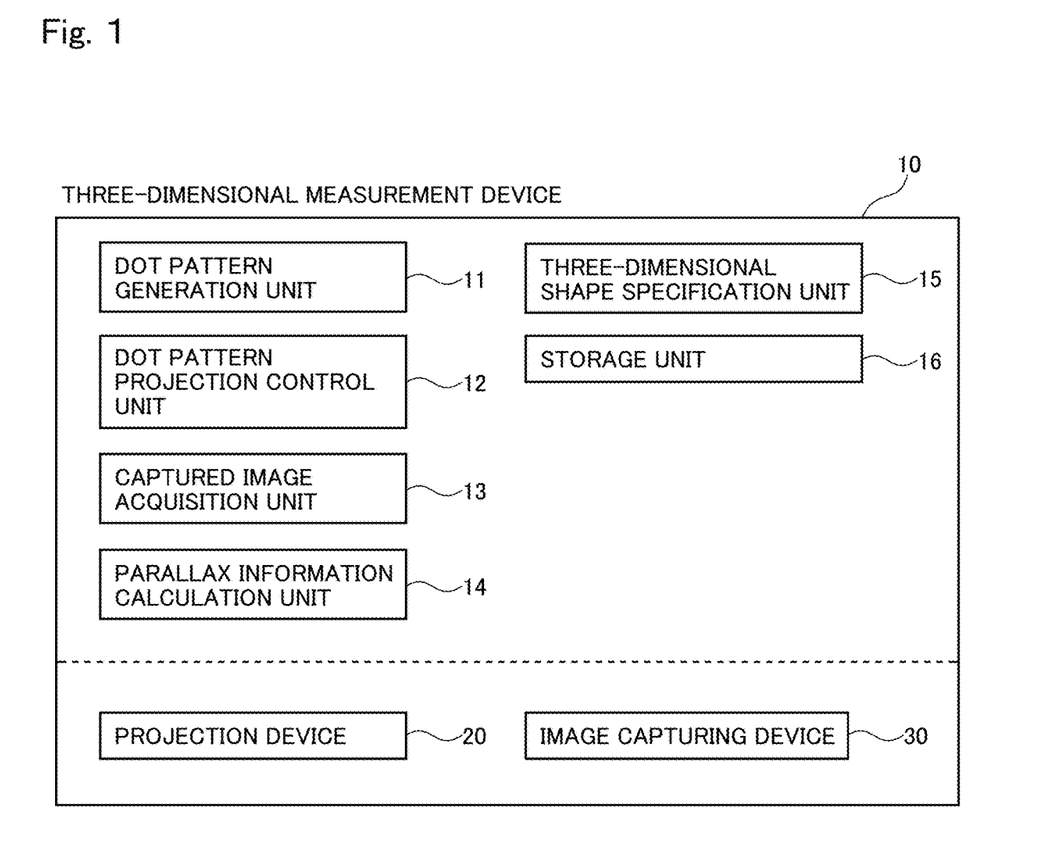
FIG. 1 is a block diagram illustrating an example of a configuration of a three-dimensional measurement device corresponding to at least one embodiment of the present invention.

FIG. 1 is a block diagram illustrating an example of a configuration of a three-dimensional measurement device corresponding to at least one embodiment of the present invention. As illustrated in FIG. 1, a three-dimensional measurement device 10 includes a dot pattern generation unit 11, a dot pattern projection control unit 12, a captured image acquisition unit 13, a parallax information calculation unit 14, a three-dimensional shape specification unit 15, and a storage unit 16.

The three-dimensional measurement device 10 is a device for performing three-dimensional measurement on an object. Specifically, the three-dimensional measurement device 10 is a device that projects projection light onto an object to capture an image, and specifies a three-dimensional shape of the object on the basis of the captured image of the object on which the projection light has been projected. Note that the three-dimensional measurement device 10 includes a central processing unit (CPU), a memory, and a storage such as a hard disk drive and an SSD, which are normally included in a general computer, and also includes an input device such as a mouse and a keyboard, an output device such as a display and a printer, and a communication device for connecting to a communication network, and these may be connected via a bus. Processing in each unit of the three-dimensional measurement device 10 is realized by reading a program for executing the processing in each unit from a memory and executing the program in a CPU, a GPU, or an FPGA that functions as a control circuit (processing circuit or processing circuitry). In other words, the processor (processing circuit) is configured to be able to execute each processing of each device by executing the program.

The three-dimensional measurement device 10 uses a projection device 20 and an image capturing device 30 in the three-dimensional measurement.

In the present example, the description will be given assuming that the three-dimensional measurement device 10 is realized as a dedicated machine, and the projection device 20 and the image capturing device 30 are integrally provided inside. Of course, the three-dimensional measurement device 10 is not necessarily provided with the projection device 20 and the image capturing device 30 inside, and an external projection device 20 and/or image capturing device 30 may be used.

The projection device 20 is a device for projecting projection light onto an object. Examples of the projection device 20 include a projector and a display. The image capturing device 30 is a device for image-capturing an object from two directions. For example, two image capturing devices 30 are provided inside the three-dimensional measurement device 10 in a portion where the object can be image-captured from two directions. In addition, for example, in a case where the image capturing device 30 is an external device independent from the three-dimensional measurement device 10, the image capturing device is two independent devices or one device including two image-capturing optical systems inside the own device. An example of the image capturing device 30 is a stereo camera.

The dot pattern generation unit 11 has a function of generating a dot pattern by a determination process of determining a reference position according to a predetermined determination rule, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times.

The dot pattern generated by the dot pattern generation unit 11 is a pattern indicating switching between light and darkness of projection light projected by the projection device 20, and is a two-dimensional pattern indicated by an arrangement of dots. The dot pattern is generated by performing the arrangement process of arranging dots on the basis of the arrangement pattern for the reference position a plurality of times. The dot pattern generated by the dot pattern generation unit 11 is referred to as an "dot pattern using arrangement pattern", and hereinafter referred to as an "present example dot pattern". Note that the shape of each dot is not particularly limited, and may be a round shape or a square shape.

In the determination process, the dot pattern generation unit 11 determines the reference position according to a predetermined determination rule. Here, the reference position is a position serving as a reference for arranging dots on the basis of the arrangement pattern, and is a position determined according to a predetermined determination rule. The reference position is given by, for example, plane coordinates in a preset region.

Furthermore, the determination rule means a rule for determining the reference position. The determination rule is not particularly limited, but a rule for determining a position such that a density of the dots in the generated dot pattern is substantially constant and a rule in which the arrangement patterns are not adjacent to each other or do not overlap each other are preferable. Furthermore, the determination rule is preferably one in which regularity does not occur in a position to be determined as the reference position (for example, a rule for determining the reference position as a random position). As an example of a rule for determining the position so that the density of the arranged dot pattern is substantially constant, there is a rule determined by a Poisson disk sampling algorithm.

Furthermore, the arrangement pattern means a pattern indicating at least one or more dot arrangements. For example, the arrangement pattern is a pattern including one dot (center dot) as a center and dots near the dot.

The dot pattern generation unit 11 selects one of a plurality of the arrangement patterns indicating at least one or more dot arrangements in the selection process. For example, the dot pattern generation unit 11 randomly selects any one pattern from the plurality of arrangement patterns. In the present example, the plurality of arrangement patterns are 25 types of patterns in which one to three dots are arranged in a dot arrangement region where up to nine dots can be arranged three vertically and three horizontally, and the dot pattern generation unit 11 randomly selects any one of the 25 types of patterns in the selection process.

The dot pattern generation unit 11 arranges the dots based on the arrangement pattern selected for the reference position in the arrangement process. Specifically, in the arrangement process, the dot pattern generation unit 11 arranges the dots so as to have the same arrangement as a combination indicated by the arrangement pattern selected in the selection process with respect to the reference position determined in the determination process. In this example, in the arrangement process, the dot pattern generation unit 11 arranges the dots with the reference position determined in the determination process as a center of three vertically three horizontally so as to have the same arrangement as the pattern selected in the selection process among 25 types of patterns indicating the arrangement of one to three dots in the dot arrangement region where up to nine dots of three vertically three horizontally can be arranged.

The dot pattern generation unit 11 generates the present example dot pattern by an iterative process in which the determination process, the selection process, and the arrangement process are performed a plurality of times. Specifically, after executing the arrangement process, the dot pattern generation unit 11 determines whether or not a series of processing of the determination process, the selection process, and the arrangement process has been performed a plurality of times. Then, the dot pattern generation unit 11 completes the generation of the present example dot pattern in a case where it is determined that the series of processing has been performed a plurality of times, and returns to the determination process in a case where it is determined that the number of execution times of the series of processing does not satisfy the plurality of times. Here, the plurality of times can be appropriately determined. For example, the plurality of times is determined based on the density of dots in the present example dot pattern to be generated.

The dot pattern projection control unit 12 has a function of controlling the projection device 20 so as to project projection light including the present example dot pattern onto an object. Here, a portion corresponding to the dots in the present example dot pattern in a case where the projection light is projected onto the object may be a portion (light portion) having high luminance or a portion (dark portion) having low luminance as compared with a portion corresponding to other than the dots. Note that, in the present example, the projection processing by the dot pattern projection control unit 12 is executed by controlling the projection device 20.

The captured image acquisition unit 13 has a function of controlling the image capturing device 30 so as to image-capture the object onto which the projection light is projected from two directions to acquire two captured images. In the present example, imaging processing from the two directions by the captured image acquisition unit 13 is executed by controlling the image capturing device 30 provided inside the three-dimensional measurement device 10. Note that, in the image capturing from the two directions, the image capturing by the image capturing device 30 is performed in a state where an object of a portion on which the projection light is projected falls within both angles of view.

The parallax information calculation unit 14 has a function of calculating parallax information for the two acquired captured images. Specifically, for the two captured images acquired by the captured image acquisition unit 13, the parallax information calculation unit 14 performs processing of specifying a portion in the other captured image corresponding to a predetermined portion of one captured image, and calculating distance information between pixel positions of the respective portions as parallax information. For example, the predetermined portion is one pixel at a predetermined position in the captured image. Then, for example, when specifying one pixel in the other captured image corresponding to one pixel at a predetermined position in the captured image, the parallax information calculation unit 14 calculates information indicating a distance between the pixel positions of the two pixels with specified correspondence as the parallax information. Here, the pixel position refers to a position corresponding to each pixel in a captured image including a plurality of pixels.

The parallax information calculation unit 14 may use luminance information of the captured image when specifying a portion in the other captured image corresponding to a predetermined portion of one captured image. The luminance information of the captured image exists, for example, for each pixel. Here, luminance information of pixels within a predetermined range based on a predetermined portion of the captured image may be used. For example, the parallax information calculation unit 14 uses luminance information of a predetermined number of pixels (for example, a total of nine pixels of three vertically and three horizontally centered on a pixel at a predetermined position) located within a predetermined range centered on one pixel at a predetermined position of the captured image.

Here, an example of a method of using the luminance information when a portion in the other captured image corresponding to a predetermined portion in the one captured image is specified will be described. First, binary vector data is generated by comparing luminance of one pixel at a predetermined position with luminance of a plurality of pixels located within a predetermined range around the one pixel and binarizing the luminance. Then, based on the Hamming distance between the captured images for the data, a portion of the other captured image corresponding to a predetermined portion of one captured image is specified. The above is an example of a method of using the luminance information.

The three-dimensional shape specification unit 15 has a function of specifying the three-dimensional shape of the object based on the calculated parallax information. Here, the three-dimensional shape specification unit 15 uses the principle of triangulation when specifying the three-dimensional shape of the object. For example, the three-dimensional shape specification unit 15 calculates distance information from the image capturing device 30 to each portion in the object using the principle of triangulation on the basis of the information indicating the distance between the pixel positions calculated by the parallax information calculation unit 14, and specifies the three-dimensional shape of the object on the basis of the calculated distance information.

The storage unit 16 has a function of storing information necessary for processing of each unit in the three-dimensional measurement device 10 and also storing various types of information generated by the processing of each unit.

Figure 2:
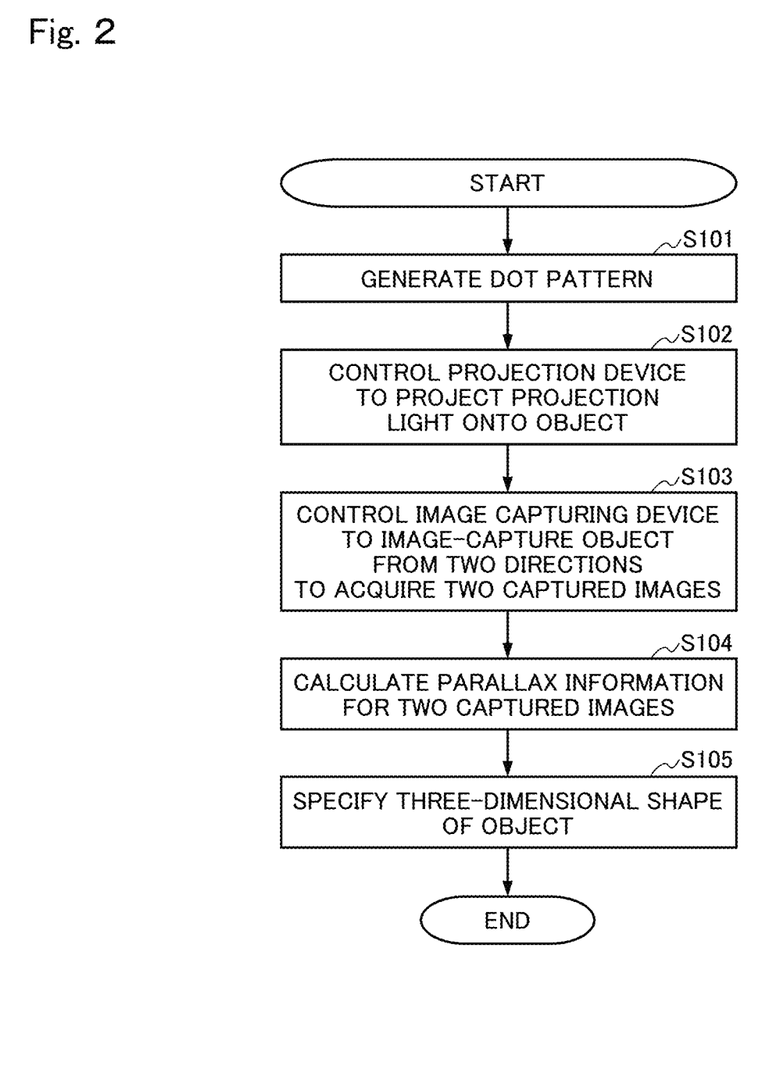
FIG. 2 is a flowchart illustrating an example of a flow of three-dimensional measurement processing corresponding to at least one embodiment of the present invention.

FIG. 2 is a flowchart illustrating an example of a flow of three-dimensional measurement processing corresponding to at least one embodiment of the present invention. A flow of the three-dimensional measurement processing in the three-dimensional measurement device 10 corresponding to at least one embodiment of the present invention will be described with reference to FIG. 2.

In FIG. 2, the three-dimensional measurement processing is started by generating the present example dot pattern in the three-dimensional measurement device 10 (step S101). An example of a detailed flow of present example dot pattern generation processing will be described with reference to FIG. 3. Next, the three-dimensional measurement device 10 controls the projection device 20 to project the projection light including the present example dot pattern onto the object (step S102). Next, the three-dimensional measurement device 10 controls the image capturing device 30 so as to image-capture the object from two directions to acquire two captured images (step S103). Next, the three-dimensional measurement device 10 calculates parallax information for the two captured images (step S104). Finally, the three-dimensional measurement device 10 specifies the three-dimensional shape of the object based on the parallax information (step S105), and the process ends.

Figure 3:
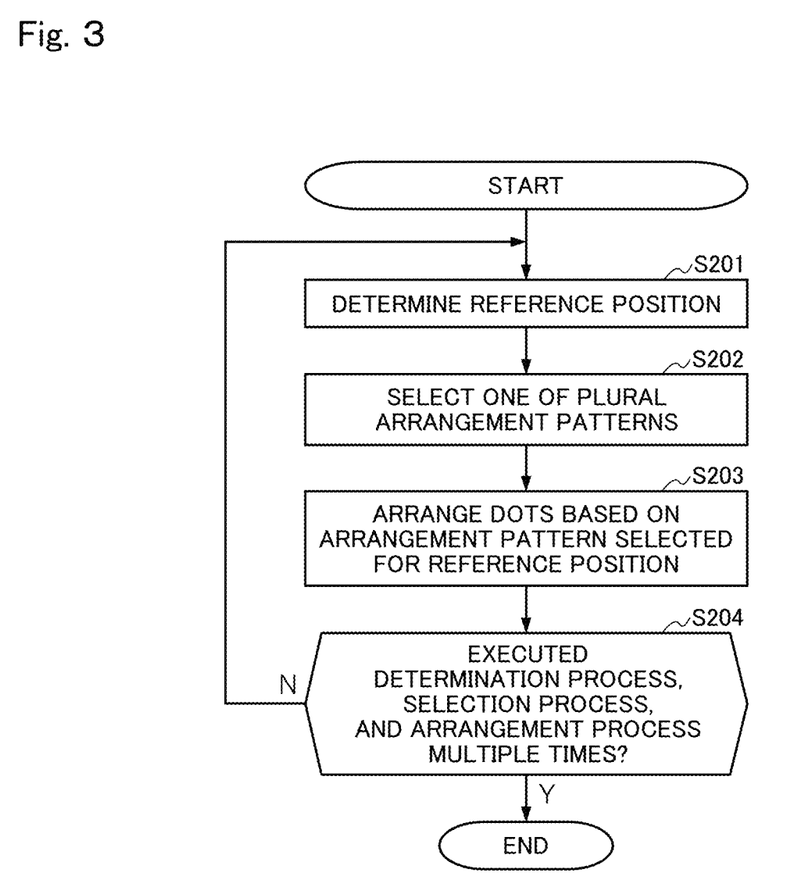
FIG. 3 is a flowchart illustrating an example of a flow of a present example dot pattern generation process corresponding to at least one embodiment of the present invention.

FIG. 3 is a flowchart illustrating an example of a flow of the present example dot pattern generation processing corresponding to at least one embodiment of the present invention. A flow of the present example dot pattern generation processing in step S101 in the three-dimensional measurement processing by the three-dimensional measurement device 10 corresponding to at least one embodiment of the present invention will be described with reference to FIG. 2.

In FIG. 3, the present example dot pattern generation processing is started by determining the reference position according to a predetermined determination rule in the three-dimensional measurement device 10 (step S201). Next, the three-dimensional measurement device 10 selects one of a plurality of arrangement patterns indicating at least one or more dot arrangements (step S202). Next, the three-dimensional measurement device 10 arranges the dots based on the arrangement pattern selected for the reference position (step S203). Next, in a case where the determination process, the selection process, and the arrangement process have not been executed a plurality of times (step S204, N), the three-dimensional measurement device 10 returns to step S201. In this example, the plurality of times in step S204 is the number of times the density of the dots in the generated dot pattern becomes a predetermined density. On the other hand, when the determination process, the selection process, and the arrangement process are executed a plurality of times (step S204, Y), the three-dimensional measurement device 10 ends the process.

Figure 4:
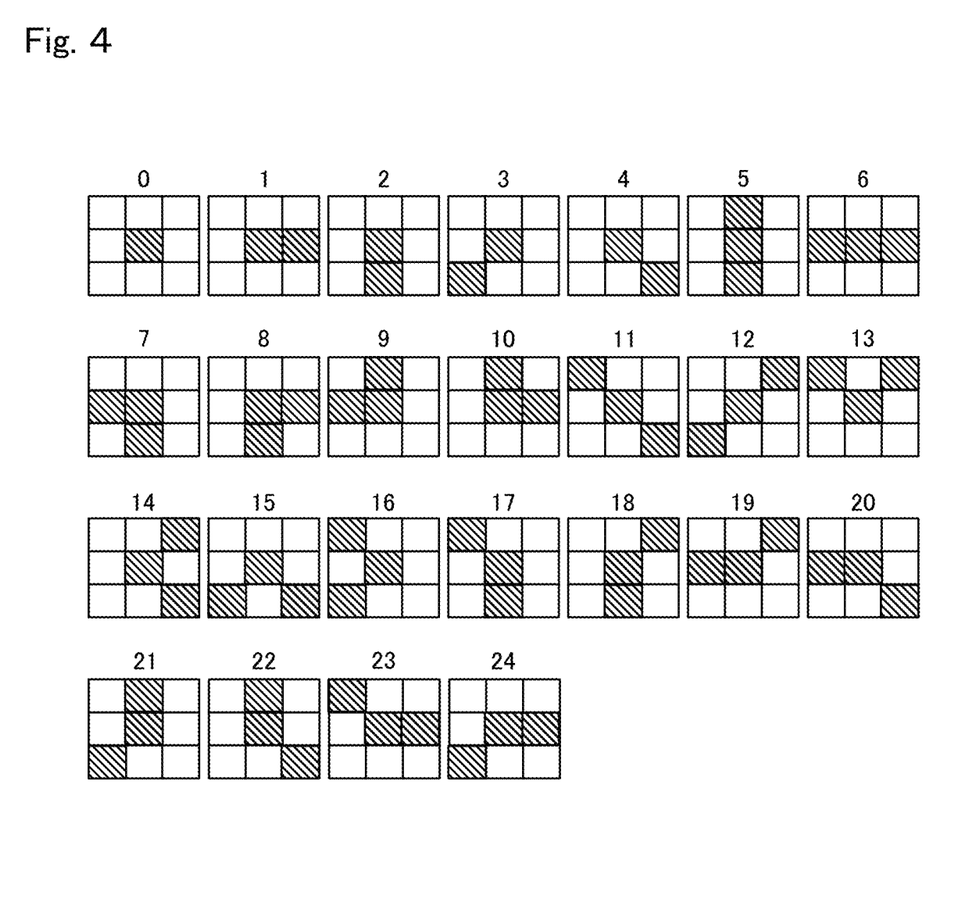
FIG. 4 is an explanatory diagram describing an example of an arrangement pattern corresponding to at least one embodiment of the present invention.

FIG. 4 is an explanatory diagram describing an example of an arrangement pattern corresponding to at least one embodiment of the present invention. FIG. 4 illustrates an example of an arrangement pattern that becomes a selection candidate by the dot pattern generation unit 11. In the example illustrated in FIG. 4, there are 25 types of arrangement patterns in total, and each is a grid-like pattern in which one to three dots are arranged in a dot arrangement region where up to nine dots of three vertically and three horizontally can be arranged. The 25 types of arrangement patterns in this example are a combination of patterns in which patterns of the same dot arrangement are not included in an overlapping manner and which do not overlap each other when moved in parallel in the dot arrangement region. Furthermore, in this example, each arrangement pattern is assigned with a unique number of 0 to 24. In the selection process by the dot pattern generation unit 11, any one of 0 to 24 is generated as a random number, and an arrangement pattern corresponding to the generated numerical value is selected. Note that in a case where the arrangement pattern indicates that two dots are arranged adjacent to each other, the two dots in the projection light projected by the dot pattern projection control unit 12 may be continuous or separated from each other by a predetermined distance.

Figure 5A:
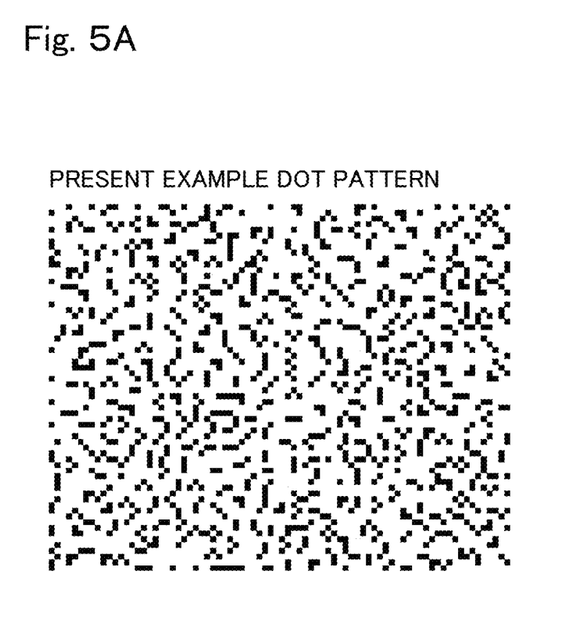
FIGS. 5A and 5B are explanatory diagrams describing an example of a present example dot pattern corresponding to at least one embodiment of the present invention.
Figure 5B:
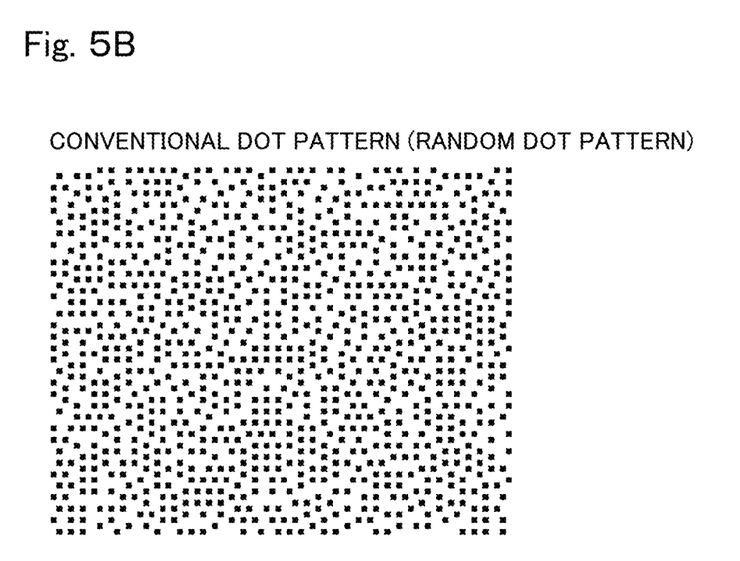

FIGS. 5A and 5B are explanatory diagrams describing an example of a dot pattern corresponding to at least one embodiment of the present invention. FIG. 5A illustrates an example of the present example dot pattern generated by the dot pattern generation unit 11. FIG. 5B illustrates an example of a conventional dot pattern which is a random dot pattern. In the dot patterns of FIGS. 5A and 5B, the dot density is substantially the same at about 20%. As illustrated in FIG. 5A, the present example dot pattern in which the dots are arranged based on the arrangement pattern can have a feature in the arrangement of the dots in each small region in the pattern as compared with the conventional dot pattern in FIG. 5B. That is, a matching degree of the dot arrangement between a plurality of the small regions in the pattern can be made lower than that of the conventional dot pattern.

Figure 6A:
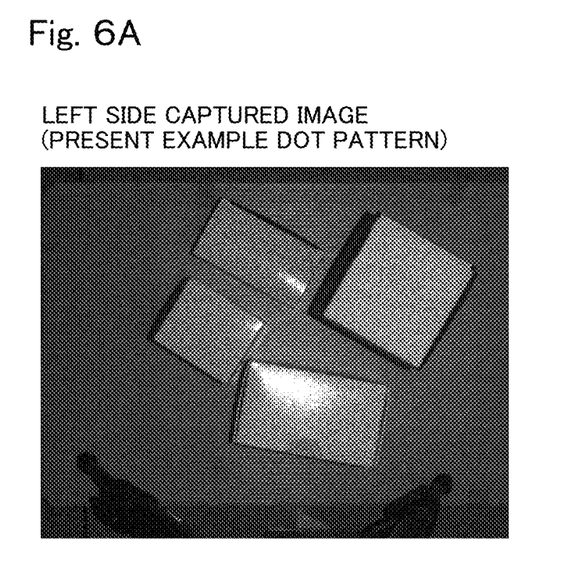
FIGS. 6A and 6B are explanatory diagrams illustrating an example of a captured image corresponding to at least one embodiment of the present invention.
Figure 6B:
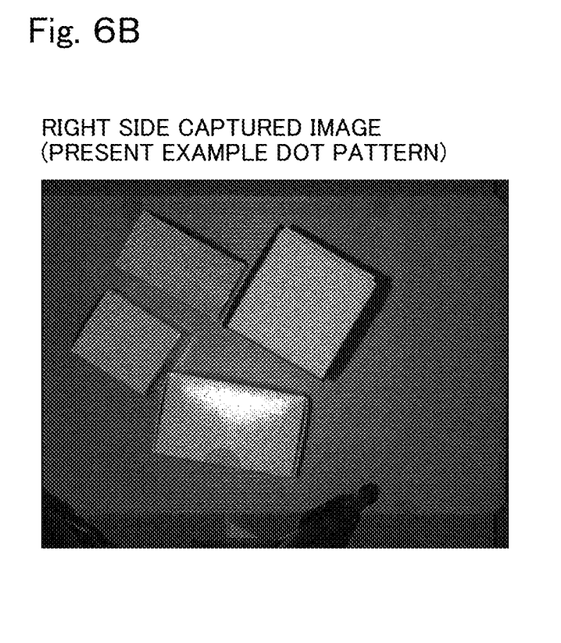

FIGS. 6A and 6B are explanatory diagrams illustrating an example of a captured image corresponding to at least one embodiment of the present invention. FIGS. 6A and 6B illustrate examples of the captured image acquired by the captured image acquisition unit 13. Here, it is assumed that the dot pattern projection control unit 12 projects projection light onto the object. FIG. 6A is a captured image acquired by image capturing from a left side from the three-dimensional measurement device 10 toward the object. FIG. 6B is a captured image acquired by image capturing from a right side from the three-dimensional measurement device 10 toward the object. As illustrated in FIGS. 6A and 6B, since the images are captured from two different directions, ranges captured on the left side and the right side are different from each other, and positions of the same portion of the object in the captured image are also different between the two captured images.

Figure 7A:
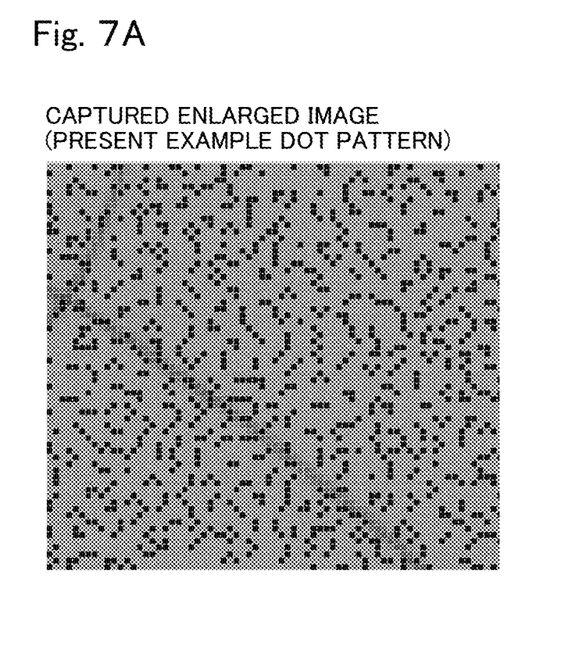
FIGS. 7A and 7B are explanatory diagrams illustrating an example of a captured enlarged image corresponding to at least one embodiment of the present invention.
Figure 7B:
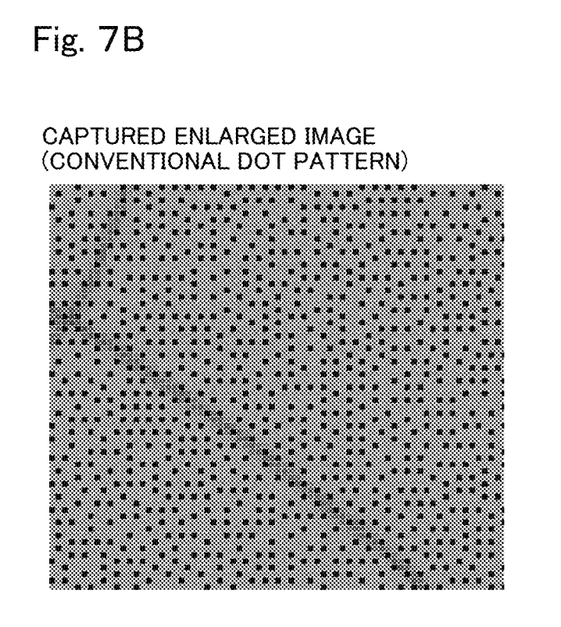

FIGS. 7A and 7B are explanatory diagrams illustrating an example of a captured enlarged image corresponding to at least one embodiment of the present invention. FIG. 7A illustrates an enlarged part of the captured image illustrated in FIG. 6. For comparison, FIG. 7B illustrates an enlarged part of a captured image in a case where projection light including a conventional dot pattern is projected on the object illustrated in FIGS. 6A and 6B instead of the present example dot pattern. In this way, the captured image acquired by the captured image acquisition unit 13 includes the dot pattern projected as the projection light, and the dot pattern is used by the parallax information calculation unit 14 to specify the corresponding portion between the two captured images.

Figure 8A:
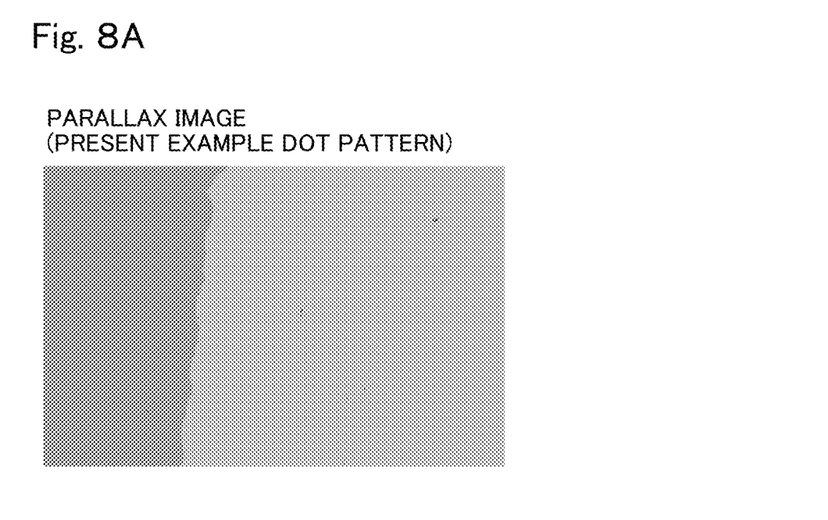
FIGS. 8A and 8B are explanatory diagrams illustrating an example of a parallax image corresponding to at least one embodiment of the present invention.
Figure 8B:
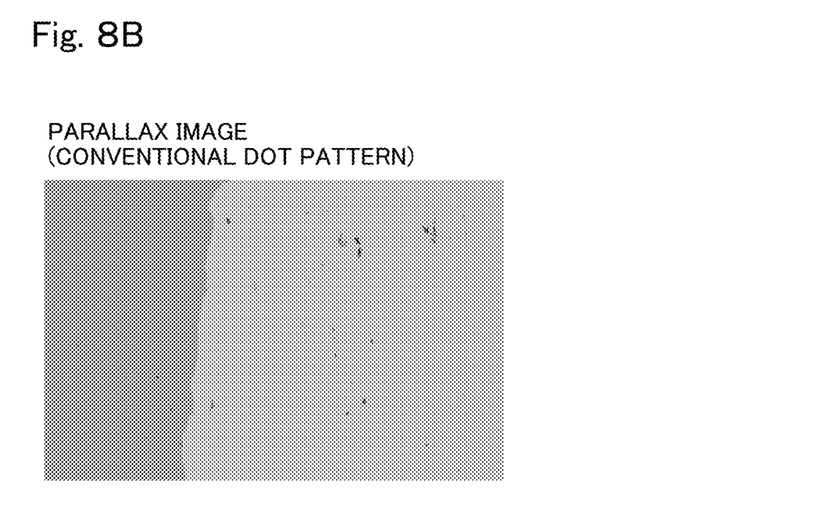

FIGS. 8A and 8B are explanatory diagrams illustrating an example of a parallax image corresponding to at least one embodiment of the present invention. FIG. 8A illustrates an enlarged parallax image generated on the basis of the result of specifying the corresponding portion between the two captured images illustrated in FIGS. 6A and 6B. For comparison, FIG. 8B illustrates a parallax image in a case where projection light including a conventional dot pattern is projected on an object instead of the present example dot pattern, which is enlarged at the same portion as in FIG. 8A.

Here, the parallax image refers to an image indicating a result of calculating a difference value for each corresponding portion between two captured images. As the noise of the parallax image decreases, it is indicated that the accuracy of specifying the corresponding portion increases. The image illustrated in FIG. 8A has less noise than the image illustrated in FIG. 8B. Specifically, in the image illustrated in FIG. 8A, the noise is smaller in the right region than in the image illustrated in FIG. 8B. As described above, it can be seen that the calculation accuracy of the parallax information is higher in the projection light including the present example dot pattern than in the projection light including the conventional dot pattern.

As described above, the three-dimensional measurement device 10 according to the present invention is configured to include the dot pattern generation unit 11, the dot pattern projection control unit 12, the captured image acquisition unit 13, the parallax information calculation unit 14, and the three-dimensional shape specification unit 15, acquires two captured images by generating a dot pattern by a determination process of determining a reference position according to a predetermined determination rule, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times, controlling the projection device 20 to project projection light including the present example dot pattern onto an object, and controlling the image capturing device 30 to image-capture the object on which the projection light is projected from two directions, calculates the parallax information for the acquired two captured images, and specifies the three-dimensional shape of the object on the basis of the calculated parallax information, so that the three-dimensional measurement of the object can be performed with high accuracy.

That is, since the present example dot pattern generated by the three-dimensional measurement device 10 is one in which the dots are arranged based on the arrangement pattern, the shape of each set of dots can have a feature. Therefore, in the case of the present example dot pattern, a degree of mismatching of the shapes between the sets of dots is higher than that in the case of the conventional dot pattern. As a result, the parallax information can be accurately calculated using the dots, and the three-dimensional shape of the object can be specified with high accuracy.

Note that the three-dimensional measurement device 10 may include, instead of the dot pattern generation unit 11, a dot pattern generation processing unit that generates the present example dot pattern in advance and stores the dot pattern in a predetermined storage unit by the determination process of determining a reference position according to a predetermined determination rule, the selection process of selecting one of a plurality of arrangement patterns indicating at least one or more dot arrangements, the arrangement process of arranging dots based on the arrangement pattern selected for the reference position, and the iterative process of performing the determination process, the selection process, and the arrangement process a plurality of times. In this case, the dot pattern projection control unit 12 reads the present example dot pattern from the storage unit, and controls the projection device 20 to project the projection light including the present example dot pattern onto the object. The method of storing the dot pattern may be a method of storing the dot pattern printed on a photomask in the device, in addition to storing the dot pattern as an image file.

Second Embodiment

A dot pattern generation unit according to a second embodiment has a function of generating a dot pattern by a determination process of determining a reference dot according to a predetermined determination rule, an arrangement process of arranging additional dots according to a predetermined addition rule in a predetermined range with respect to the reference dot, and an iterative process of performing the determination process and the arrangement process a plurality of times. The dot pattern generation unit according to the second embodiment will be described below with respect to differences from the dot pattern generation unit 11 according to the first embodiment. Note that description of configurations similar to those of the first embodiment other than the dot pattern generation will be omitted.

The reference dot is a dot serving as a reference for arranging the additional dots, and is a dot whose position is determined according to a predetermined determination rule. Since the determination rule here has the same contents as those described in the first embodiment, the description thereof will be omitted.

The additional dots are dots whose positions are determined within a predetermined range according to a predetermined addition rule based on the position of the reference dot. The addition rule is a rule for additionally arranging at least one or more dots with reference to the position of the reference dot. For example, the predetermined range is a range within a predetermined distance based on the position of the reference dot, and the addition rule is a rule of arranging the additional dots at positions based on the position of the reference dot. Furthermore, the addition rule may be, as to where the additional dots are arranged with respect to the reference dot, a rule for determining positions where, when the reference dot and the additional dots are moved in parallel within a predetermined range, patterns do not overlap each other with respect to a case where the additional dots are arranged at other positions.

Note that the three-dimensional measurement device according to the second embodiment may include, instead of the dot pattern generation unit in the second embodiment, a dot pattern generation processing unit that generates a dot pattern in advance and stores the dot pattern in a predetermined storage unit by a determination process of determining a reference dot according to a predetermined determination rule, an arrangement process of arranging additional dots according to a predetermined addition rule in a predetermined range with respect to the reference dot, and an iterative process of performing the determination process and the arrangement process a plurality of times. In this case, the dot pattern projection control unit 12 according to the second embodiment reads the dot pattern from the storage unit, and controls the projection device 20 to project the projection light including the dot pattern onto the object. The method of storing the dot pattern may be a method of storing the dot pattern printed on a photomask in the device, in addition to storing the dot pattern as an image file.

REFERENCE SIGNS LIST

10 Three-dimensional measurement device
11 Dot pattern generation unit
12 Dot pattern projection control unit
13 Captured image acquisition unit
14 Parallax information calculation unit
15 Three-dimensional shape specification unit
16 Storage unit
20 Projection device
30 Image capturing device

The invention claimed is:

1. A three-dimensional measurement device that performs three-dimensional measurement on an object, the three-dimensional measurement device comprising:
    a dot pattern generation unit that generates a dot pattern by a determination process of determining a reference position according to a rule defined by a Poisson disk sampling algorithm, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times;
    a dot pattern projection control unit that controls a projection device to project projection light including the dot pattern onto the object;
    a captured image acquisition unit that controls an image capturing device to image-capture the object onto which the projection light is projected from two directions to acquire two captured images;
    a parallax information calculation unit that calculates parallax information about the acquired two captured images; and
    a three-dimensional shape specification unit that specifies a three-dimensional shape of the object based on the calculated parallax information.

2. The three-dimensional measurement device according to claim 1, wherein the plurality of arrangement patterns are, as to where dots are arranged in a preset dot arrangement region, a combination of patterns that do not overlap each other when the dots are moved in parallel in the dot arrangement region.

3. A three-dimensional measurement device that performs three-dimensional measurement on an object, the three-dimensional measurement device comprising:
    a dot pattern generation processing unit that generates a dot pattern in advance and stores the dot pattern in a predetermined storage unit by a determination process of determining a reference position according to a rule defined by a Poisson disk sampling algorithm, a selection process of selecting one of a plurality of arrangement patterns indicating at least one or more dot arrangements, an arrangement process of arranging dots based on the arrangement pattern selected for the reference position, and an iterative process of performing the determination process, the selection process, and the arrangement process a plurality of times;
    a dot pattern projection control unit that reads the dot pattern from the storage unit and controls a projection device to project projection light including the dot pattern onto the object;
    a captured image acquisition unit that controls an image capturing device to image-capture the object onto which the projection light is projected from two directions to acquire two captured images;
    a parallax information calculation unit that calculates parallax information about the acquired two captured images; and a three-dimensional shape specification unit that specifies a three-dimensional shape of the object based on the calculated parallax information.

4. The three-dimensional measurement device according to claim 3, wherein the plurality of arrangement patterns are, as to where dots are arranged in a preset dot arrangement region, a combination of patterns that do not overlap each other when the dots are moved in parallel in the dot arrangement region.

5. A three-dimensional measurement device that performs three-dimensional measurement on an object, the three-dimensional measurement device comprising:

a dot pattern generation unit that generates a dot pattern by a determination process of determining a reference dot according to a rule defined by a Poisson disk sampling algorithm, an arrangement process of arranging additional dots according to a predetermined addition rule in a predetermined range with respect to the reference dot, and an iterative process of performing the determination process and the arrangement process a plurality of times;

a dot pattern projection control unit that controls a projection device to project projection light including the dot pattern onto the object;

a captured image acquisition unit that controls an image capturing device to image-capture the object onto which the projection light is projected from two directions to acquire two captured images;

a parallax information calculation unit that calculates parallax information about the acquired two captured images; and a three-dimensional shape specification unit that specifies a three-dimensional shape of the object based on the calculated parallax information.

6. The three-dimensional measurement device according to claim 5, wherein the addition rule is, as to where the additional dots are arranged with respect to the reference dot, a rule for determining positions where, when the reference dot and the additional dots are moved in parallel within a predetermined range, patterns do not overlap each other with respect to a case where the additional dots are arranged at other positions.

7. A three-dimensional measurement device that performs three-dimensional measurement on an object, the three-dimensional measurement device comprising:

a dot pattern generation processing unit that generates a dot pattern in advance and stores the dot pattern in a predetermined storage unit by a determination process of determining a reference dot according to a rule defined by a Poisson disk sampling algorithm, an arrangement process of arranging additional dots according to a predetermined addition rule in a predetermined range with respect to the reference dot, and an iterative process of performing the determination process and the arrangement process a plurality of times;

a dot pattern projection control unit that reads the dot pattern from the storage unit and controls a projection device to project projection light including the dot pattern onto the object;

a captured image acquisition unit that controls an image capturing device to image-capture the object onto which the projection light is projected from two directions to acquire two captured images;

a parallax information calculation unit that calculates parallax information about the acquired two captured images; and a three-dimensional shape specification unit that specifies a three-dimensional shape of the object based on the calculated parallax information.

8. The three-dimensional measurement device according to claim 7, wherein the addition rule is, as to where the additional dots are arranged with respect to the reference dot, a rule for determining positions where, when the reference dot and the additional dots are moved in parallel within a predetermined range, patterns do not overlap each other with respect to a case where the additional dots are arranged at other positions.

* * * * *